United States Patent
Yagyu et al.

(10) Patent No.: US 10,608,495 B2
(45) Date of Patent: Mar. 31, 2020

(54) LIQUID-COOLED MOTOR

(71) Applicant: KUBOTA CORPORATION, Osaka (JP)

(72) Inventors: Sumio Yagyu, Osaka (JP); Kazuto Okazaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/014,304

(22) Filed: Jun. 21, 2018

(65) Prior Publication Data

US 2018/0331594 A1 Nov. 15, 2018

Related U.S. Application Data

(63) Continuation of application No. PCT/JP2016/085772, filed on Dec. 1, 2016.

(30) Foreign Application Priority Data

Dec. 24, 2015 (JP) .................................. 2015-252269

(51) Int. Cl.
*H02K 5/20* (2006.01)
*H02K 9/16* (2006.01)
(Continued)

(52) U.S. Cl.
CPC .................. *H02K 5/20* (2013.01); *F28F 1/16* (2013.01); *H02K 9/16* (2013.01); *H02K 9/00* (2013.01); *H02K 9/19* (2013.01)

(58) Field of Classification Search
CPC ........... H02K 5/20; H02K 9/00; H02K 9/005; H02K 9/12; H02K 9/16; H02K 9/18;
(Continued)

(56) References Cited

U.S. PATENT DOCUMENTS

2010/0007227 A1* 1/2010 Smith ..................... H02K 5/20
310/64

FOREIGN PATENT DOCUMENTS

JP S62 178139 8/1987
JP S62 244242 A 10/1987
(Continued)

OTHER PUBLICATIONS

Baba Ryusuke, On Vehicle Electronics, Nov. 12, 2015, JP 2015201564 (English Machine Translation) (Year: 2015).*
(Continued)

*Primary Examiner* — Jermele M Hollington
*Assistant Examiner* — Alexander A Singh
(74) *Attorney, Agent, or Firm* — Grenblum & Bernstein, P.L.C.

(57) ABSTRACT

A liquid-cooled motor includes a motor arranged inside a motor case; an internal tube arranged inside the motor case; an external tube arranged outside the motor case; and a supporting member fixed to the motor case to support the internal tube and the external tube and to allow the internal tube and the external tube to be communicated with each other. The supporting member includes a first supporting portion arranged to the motor case side to support the internal tube; and a second supporting portion arranged to another side opposite to the motor case side to support the external tube. The first supporting portion includes sealing members arranged along an outer circumference surface of the internal tube; an air chamber arranged between the sealing members; and a water draining portion allowing the air chamber and an outside portion of the motor case to be communicated with each other.

4 Claims, 7 Drawing Sheets

(51) Int. Cl.
*F28F 1/16* (2006.01)
*H02K 9/19* (2006.01)
*H02K 9/00* (2006.01)

(58) Field of Classification Search
CPC .......... H02K 9/19; H02K 9/193; H02K 9/197;
H02K 9/20; H02K 9/22; H02K 9/24;
H02K 9/26; H02K 9/28; H02K 1/20;
F28F 1/16
USPC ........ 310/52, 54, 57, 58, 59, 60 R, 60 A, 64
See application file for complete search history.

(56) References Cited

FOREIGN PATENT DOCUMENTS

| | | | |
|---|---|---|---|
| JP | 2006197781 | | 7/2006 |
| JP | 2014230358 | | 12/2014 |
| JP | 2015201564 | | 11/2015 |
| JP | 2015201564 | A * | 11/2015 |

OTHER PUBLICATIONS

International Search Report in International Patent Application PCT/JP2016/085772, dated Jan. 10, 2017.
International Preliminary Report on Patentability in International Patent Application PCT/JP2016/085772, dated Jun. 26, 2018.
European Search Report in EP Application No. 16878301.7-1201, dated May 22, 2019.

* cited by examiner

LIQUID-COOLED MOTOR

CROSS-REFERENCE TO RELATED APPLICATIONS

The present application is a continuation application of International Application No. PCT/JP 2016/085772, filed Dec. 1, 2016, which claims priority to Japanese Patent Application No. 2015/252269, filed Dec. 24, 2015. The contents of these applications are incorporated herein by reference in their entirety.

FIELD OF THE INVENTION

The present invention relates to a liquid-cooled motor serving as a driving prime mover and a power generator.

DISCUSSION OF THE BACKGROUND

A rotary electric machine (a motor generator) serving as a driving prime mover and a power generator is installed also in a working machine such as a skid steer loader and a compact track loader in addition to the hybrid automobile. As the motor mentioned above, a permanent magnet motor providing a compact size and a high power is often employed. The permanent magnet motor needs to be prevented from the overheating in order to continue the normal operation. In addition, since the permanent magnet motor requires a large capacity of cooling per unit volume, a highly efficient cooling system is preferable, and a cooling system in which a liquid is circulated is particularly preferable. A motor employing a liquid cooling method (hereinafter referred to as a liquid-cooled motor) includes a stator that forms a magnetic path at equal circumferential intervals, a motor case that is fitted to the outer circumferential surface of the stator, and a cooling liquid passage formed between the outer circumferential surface of the stator and the inner circumferential surface of the motor case. The applicant of the present invention has filed the application of the liquid-cooled motor mentioned above that is a liquid-cooled motor configured to cool the stator and the motor case evenly in the circumferential direction without intervening the magnetic path of the stator (refer to the Japanese Unexamined Patent Application Publication No. 2014-230358).

In the liquid-cooled motor disclosed in Japanese Unexamined Patent Application Publication No. 2014-230358, the stator winding of the stator projects the end portion of the stator winding outward from the left side surface of and the right side surface of the stator, a width of the motor case in the axial center direction is formed to be larger than a width of the stator in the axial center direction so as to cover the end portion of the stator winding, and a liquid-supplying tube having an annular shape is arranged facing the outer circumferential side of the left and right side surfaces of the stator (radially outward from the stator winding) and the end portion of the inner circumferential surface of the motor case in the axial center direction. The liquid-supplying pipe includes an annular pipe portion positioned on the outer circumference of the side surface of the stator and communicating with all of the liquid-flowing tubes and includes at least one communicating pipe connected to the annular pipe portion and having the inside communicating with the annular pipe portion, and the communicating pipe is connected to a pump by a hose or the like, the pump being provided outside the motor.

SUMMARY OF THE INVENTION

A liquid-cooled motor includes a motor case, a motor arranged inside the motor case, an internal tube in which cooling liquid flows, the internal tube being arranged inside the motor case, an external tube in which the cooling liquid flows, the external tube being arranged outside the motor case, and a supporting member fixed to the motor case, the supporting member supporting the internal tube and the external tube and allowing the internal tube and the external tube to be communicated with each other, wherein the supporting member includes a first supporting portion arranged to a side of the motor case, the first supporting portion supporting the internal tube, and a second supporting portion arranged to another side opposite to the side of the motor case, the second supporting portion supporting the external tube, and wherein the first supporting portion includes a plurality of sealing members circularly arranged along an outer circumference surface of the internal tube at intervals in a direction of an axial of the internal tube, an air chamber arranged between the plurality of the sealing members, and a water draining portion allowing the air chamber and an outside portion of the motor case to be communicated with each other.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
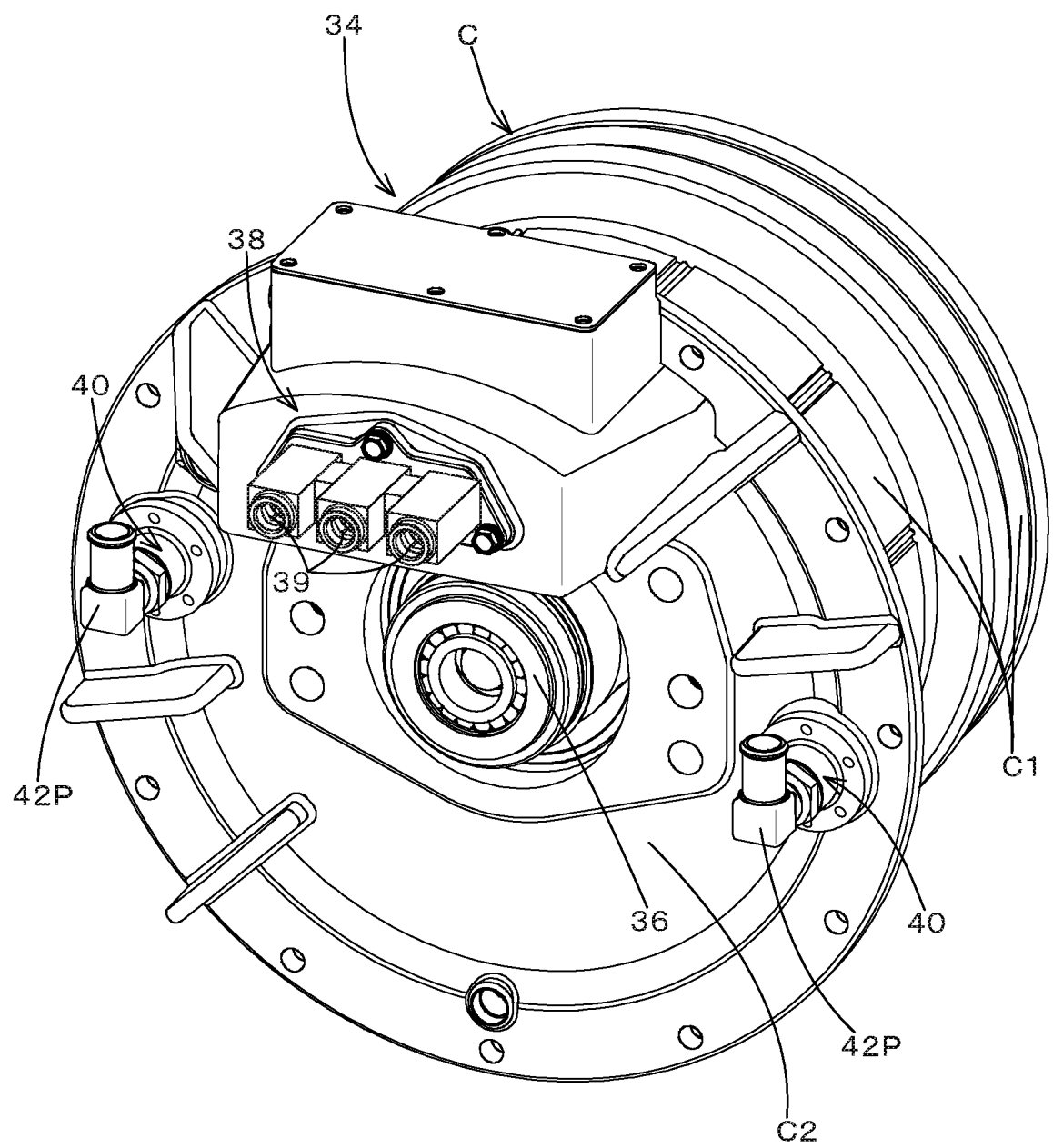
FIG. 1 is a perspective view illustrating a liquid-cooled motor according to embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to the drawings, a preferred embodiment of a liquid-cooled motor and a piping connecting portion included in the liquid-cooled motor according to the present invention will be described below, exemplifying a working machine on which the liquid-cooled motor is mounted. In addition, the liquid-cooled motor according to the present invention includes a motor generator.

[Overall Configuration of Working Machine]

The overall configuration of the working machine will be described at first.

Figure 5:
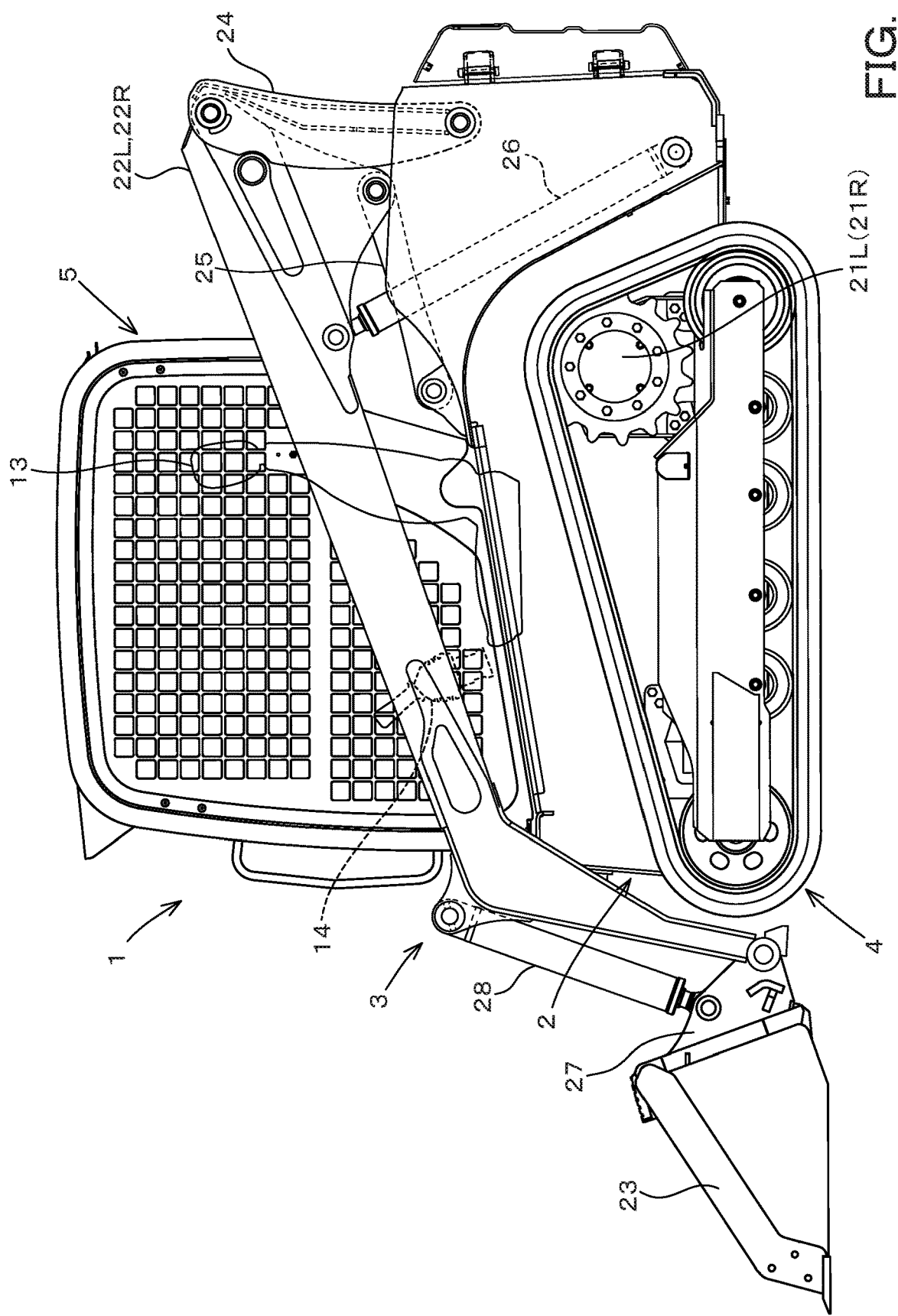
FIG. 5 is a side view illustrating a track loader that is one example of working machines according to the embodiment.
Figure 6:
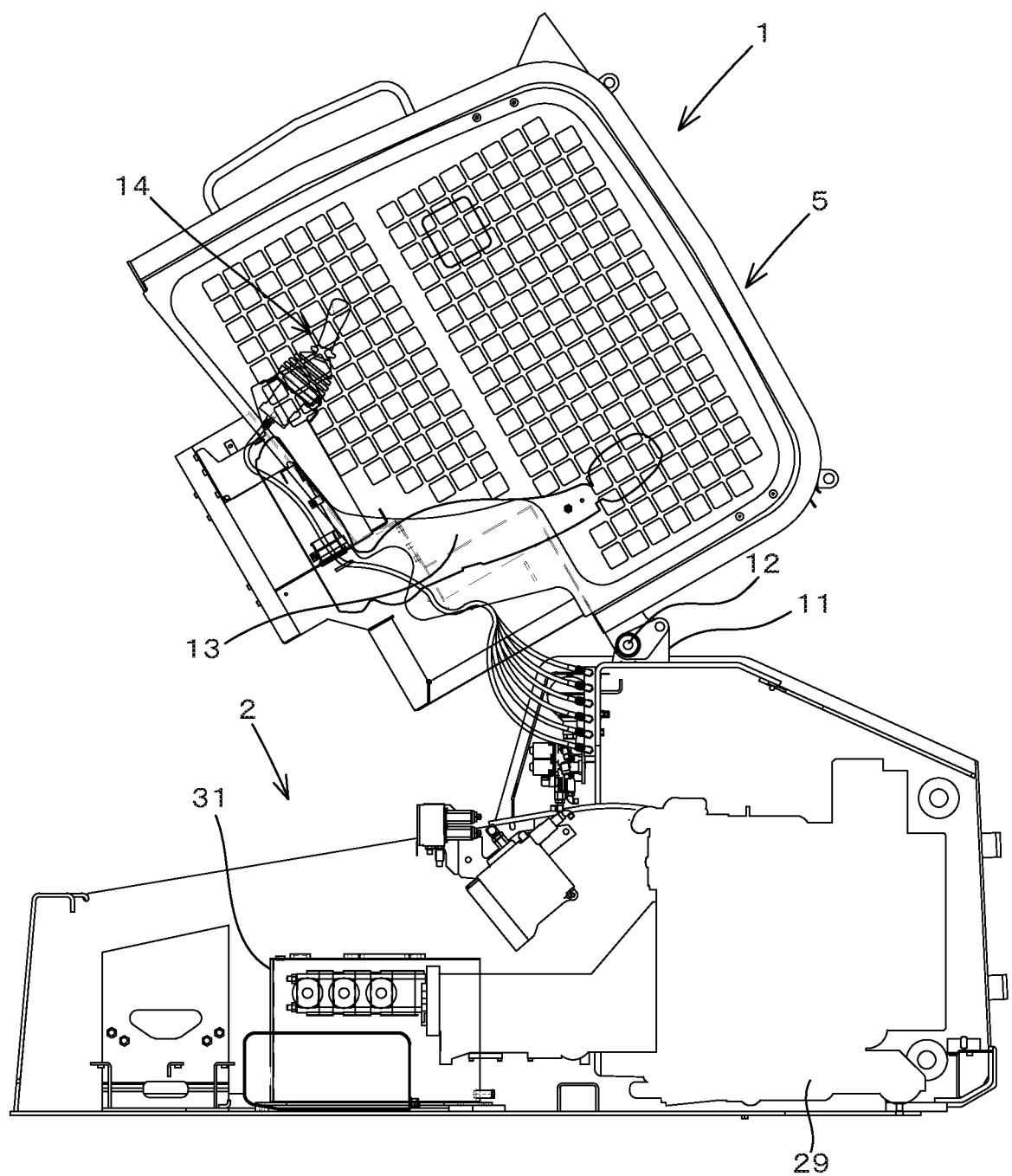
FIG. 6 is a side view illustrating a part of the track loader lifting up a cabin according to the embodiment.

As shown in FIG. 5 and FIG. 6, the working machine 1 according to the present invention includes a machine body 2, a working device 3 mounted on the machine body 2, and a traveling device 4 configured to support the machine body 2. FIG. 5 and FIG. 6 illustrate a track loader as an example of the working machine; however, the working machine on which the liquid-cooled motor according to the present invention is mounted is not limited to the track loader and may be a tractor, a skid steer loader, a compact track loader, a backhoe, or the like. In explanations of the embodiment of the present invention, a front side of an operator seated on an operator seat of the working machine (the left side of FIG. 5) is referred to as the front, a rear side of the operator (the right side of FIG. 5) is referred to as the rear, a left side of the operator (a front surface side of the sheet of FIG. 5) is referred to as the left, and a right side of the operator (a back surface side of the sheet of FIG. 5) is referred to as the right.

A cabin 5 is mounted on a front portion of an upper portion of the machine body 2. A rear portion of the cabin 5 is supported by the supporting bracket 11 of the machine body 2 so as to be swingable about the supporting shaft 12. A front portion of the cabin 5 is configured to be mounted on the front portion of the machine body 2.

An operator seat 13 is installed inside the cabin 5. On one side (for example, the left side) of the operator seat 13, a traveling operation device 14 configured to operate the traveling device 4 is arranged.

The traveling device 4 is constituted of a crawler type traveling device. The traveling device 4 is arranged under the left side of the machine body 2 and under the right side of the machine body 2. The traveling device 4 includes a first traveling portion 21L and a second traveling portion 21R each configured to be activated to be driven by a hydraulic pressure, and is configured to travel with use of the first traveling portion 21L and the second traveling portion 21R.

The working device 3 includes a boom 22L, a boom 22R, and a bucket 23 (a working tool). The boom 22L is arranged on the left side of the machine body 2. The boom 22R is arranged on the right side of the machine body 2. The boom 22L and the boom 22R are coupled to each other by a coupling body. The boom 22L and the boom 22R are supported by the first lift link 24 and the second lift link 25. A lift cylinder 26 constituted of a double acting hydraulic cylinder is provided between a base portion sides of the boom 22L and the boom 22R and a rear lower portion of the machine body 2. Simultaneously extending and shortening the lift cylinder 26, the boom 22L and the boom 22R are swung up and down. Attachment brackets 27 are respectively supported pivotally on the tip end sides of the boom 22L and the boom 22R so as to be turned about a lateral axis, and the back surface side of the bucket 23 is attached to the attachment brackets 27 provided on the left and the right.

A tilt cylinder 28 constituted of a double acting hydraulic cylinder is provided between the attachment brackets 27 and the middle portions of the boom 22L and the boom 22R, the middle portions being close to the tip end side of the boom 22L and the boom 22R. The tilt cylinder 28 is extended and shortened, and thereby the bucket 23 is swung (a shoveling operation/a dumping operation).

The bucket 23 is configured to be attachable to and detachable from the attachment bracket 27. When the bucket 23 is removed and the various types of attachments (the hydraulically-driven working tools having a hydraulic actuator to be described later) are attached to the attachment bracket 27, that configuration allows various types of working operations other than the excavation (or another excavating operation). A prime mover 29 is provided on the rear side of the machine body. The prime mover 29 is an engine. Meanwhile, it should be noted that the prime mover 29 may be an electric motor (a motor generator), or may include both of the engine and the electric motor, and the prime mover 29 having both of them will be described below in the following explanation. In addition, a tank (a hydraulic fluid tank) 31 configured to store a hydraulic fluid is provided on the machine body 2.

The liquid-cooled motor according to the embodiment of the present invention constitutes a power transmission mechanism of the working machine 1. In the explanation of the embodiment, the power transmission mechanism has a parallel hybrid configuration. Referring to a perspective view (FIG. 7) illustrating a schematic arrangement of the power transmission mechanism, an outline of the power transmission mechanism will be described below, the power transmission mechanism including a motor generator 34 that is a motor constituting the liquid-cooled motor according to the embodiment of the present invention.

Figure 7:
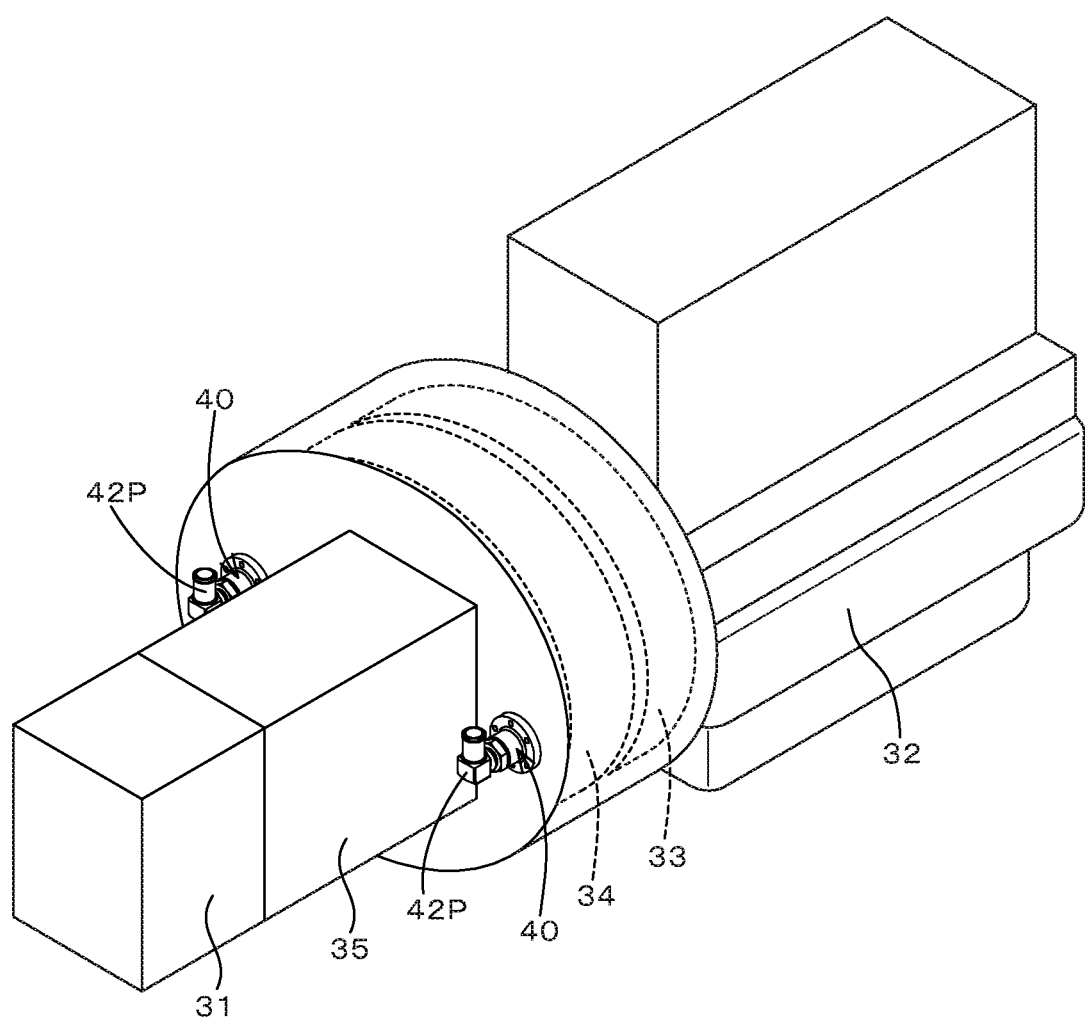
FIG. 7 is a perspective view illustrating a schematic arrangement of a power transmission mechanism of the track loader according to the embodiment.

As shown in FIG. 7, the power transmission mechanism includes at least an engine 32, a flywheel 33, and the motor generator 34. The power transmission mechanism transmits the power of the engine 32 and the power of the motor generator 34 to the hydraulic pump 35 in an alternative manner or in a combination manner, the hydraulic pump 35 being an example of a driven machine.

The engine 32 is constituted of a diesel engine, a gasoline engine or the like. The crankshaft of the engine 32 protrudes toward the hydraulic pump 35 side, and a flywheel 33 is connected to the tip end of the crankshaft (on the hydraulic pump 35 side).

The flywheel 33 is formed of a material having a substantially-disk shape and having a large mass (for example, a metal such as a cast iron). A crankshaft of the engine 32 is connected to the center of the flywheel 33. The flywheel 33 is surrounded by a flywheel housing.

The motor generator 34 is arranged on the flywheel 33 and on the hydraulic pump 35 side. The motor generator 34 has a rotor (rotator) and a stator. As the motor generator 34, a three-phase AC synchronous motor having an embedded permanent magnet is preferably employed, however another type of synchronous motor may be employed.

When the motor generator 34 functions serving as an electric generator (a generator), the rotor receives a rotational power of the flywheel 33. On the other hand, when the motor generator 4 functions serving as an electric motor (a motor), the rotor applies a rotational power to the flywheel 33. That is, the motor generator 34 receives the rotational power through the flywheel 33.

The hydraulic pump 35 serving as the driven machine is driven by receiving the power applied from the engine 32 and/or the motor generator 34. Specifically, a hydraulic pump for a hydrostatic transmission can be exemplified as the hydraulic pump 35.

In the power transmission mechanism of the working machine 1 having the above-mentioned schematic arrangement, the motor generator 34 includes a cooling structure inside, the motor generator 34 being the motor constituting the liquid-cooled motor according to the embodiment of the present invention, and includes a piping connecting portion 40 serving as a piping adapter configured to connect the cooling structure arranged inside and the cooling pipe arranged outside (an external tube 42P) to each other. In the description of the motor generator 34 that is a motor constituting the liquid-cooled motor according to the embodiment of the present invention, the motor generator 34 is less related to the piping connecting portion 40 that is a technical feature of the embodiment of the present invention, and thus the configuration of the motor generator 34 will not described below.

[Schematic Configuration of Liquid-cooled Motor]

Figure 2:
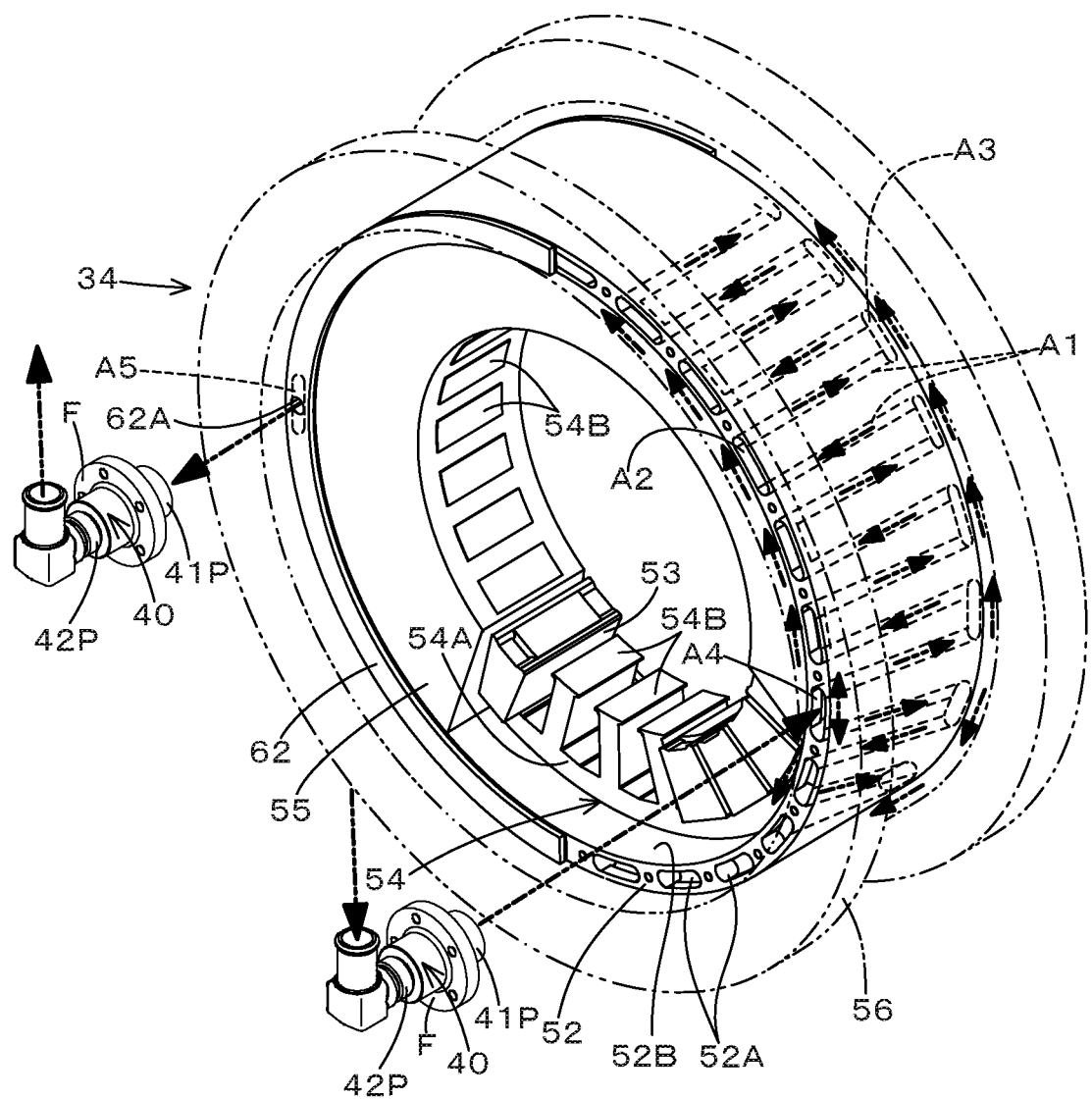
FIG. 2 is a perspective view explaining a cooling structure of the liquid-cooled motor according to the embodiment of the present invention.
Figure 3:
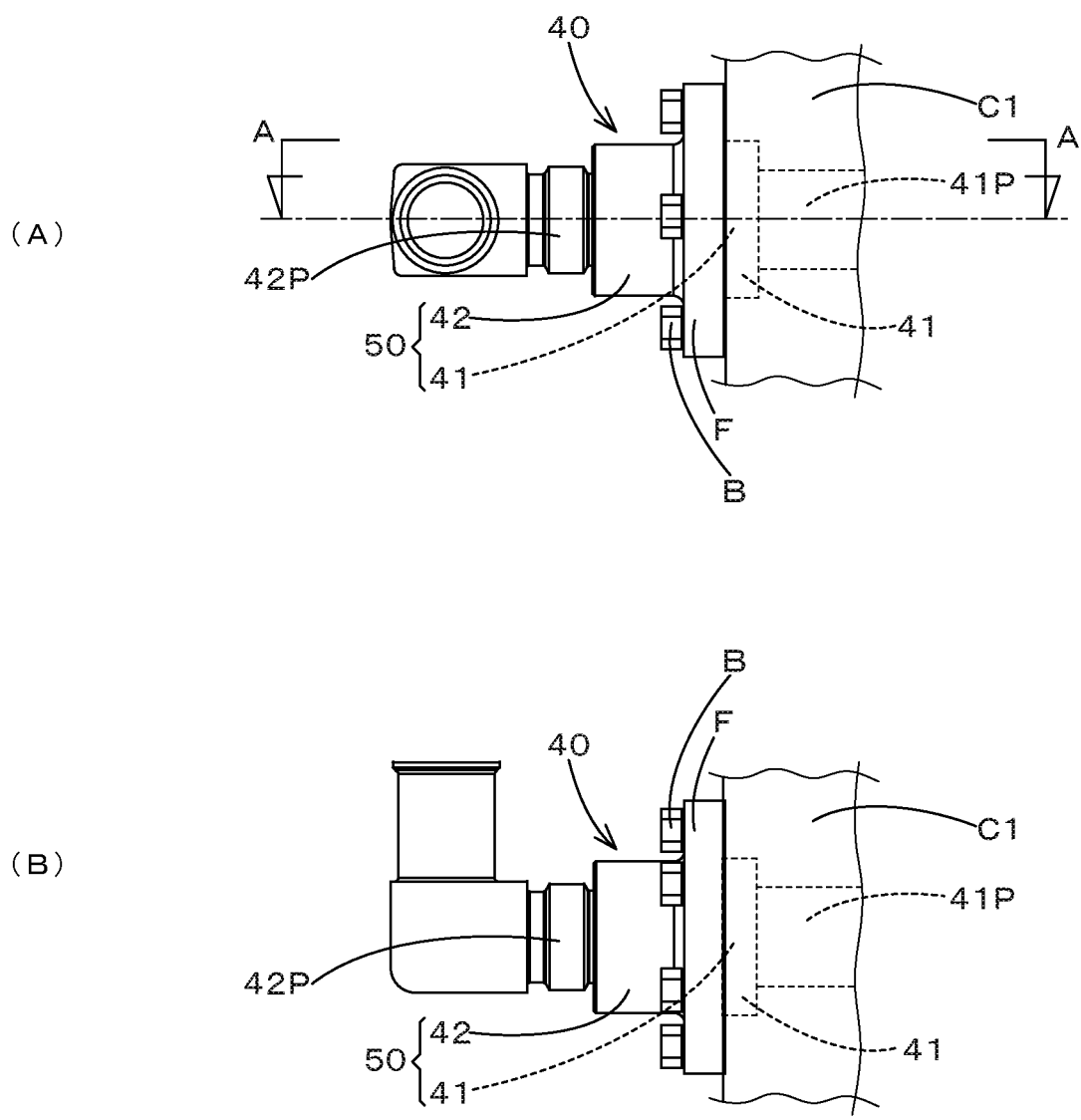
FIG. 3 is a view illustrating an upper surface of a piping connecting portion of FIG. 1 and FIG. 2 in (A) and illustrating a side surface of the piping connecting portion in (B)
Figure 4:
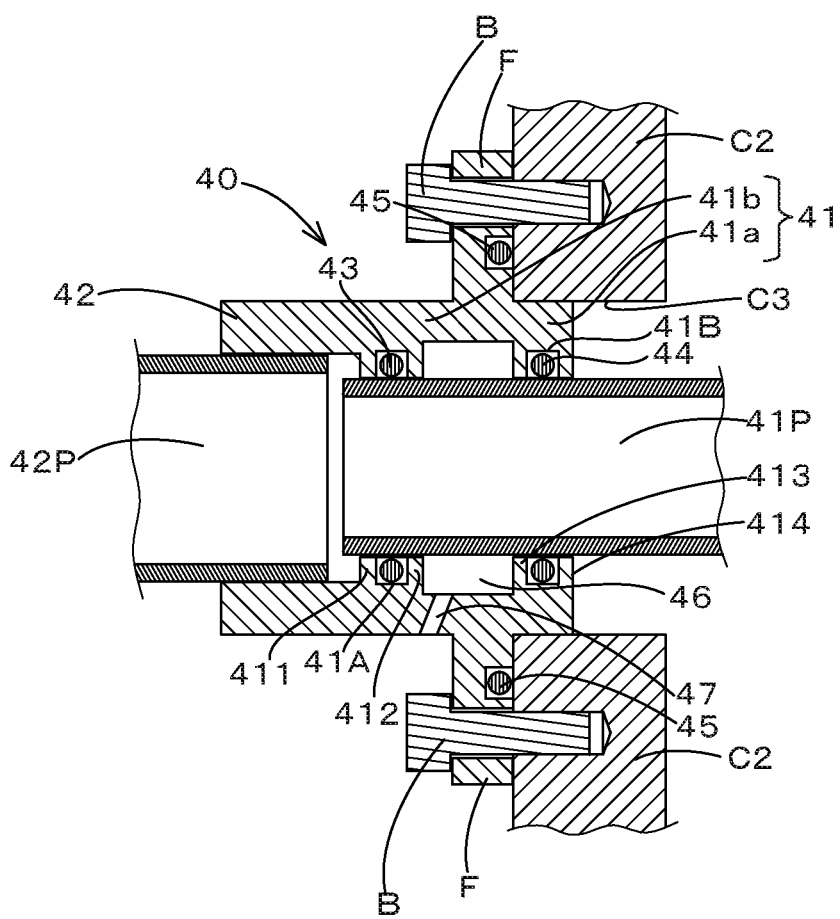
FIG. 4 is a view illustrating an A-A cross section of (A) shown in FIG. 3.

Next, the cooling structure and the piping connecting portion 40 included in the motor generator 34 will be described more in detail, the motor generator 34 being a motor constituting the liquid-cooled motor arranged at the above-mentioned position according to the embodiment of the present invention. FIG. 1 is a perspective view illustrating the motor generator 34 taken out from the power transmission mechanism of FIG. 7. FIG. 2 is a perspective view explaining the cooling structure of the motor generator 34. FIG. 3 (A) shows an upper surface view of the piping connecting portion 40, and FIG. 3 (B) shows a side surface view of the piping connecting portion 40. FIG. 4 shows a view illustrating a cross section taken along a line A-A of FIG. 3 (A). As shown in FIG. 1, an inverter device is electrically connected to the stator wiring by a socket 39 of a terminal board 38, the stator wiring being arranged inside the motor generator 34. In addition, as in the following explanations, a cooling liquid pump is connected to the cooling liquid pipe by the piping connecting portion 40, the cooling liquid pipe being arranged inside the motor generator 34. When the rotating shaft 36 of the motor generator 34 rotates, the cooling liquid pipe inside the motor receives the vibrations generated in the radial direction or the vibrations generated in the thrust direction.

As shown in FIG. 1, the motor generator (the motor) 34 is arranged inside the motor case C. The motor case C includes a tubular portion C1 and an end surface portion C2, the tubular portion C1 being provided so as to surround the outer circumference of the motor generator 34, the end surface portion C2 being provided at an end portion of the tubular portion C1 on the hydraulic pump 35 side. FIG. 2 shows a perspective view (partly an exploded perspective view) illustrating the stator side of the motor generator 34 from which the motor case C is removed and the structures other than the cooling structure on the stator side is virtually removed from the state shown in FIG. 1. Referring to FIG. 2, the stator of the motor generator 34 will be described.

The motor generator 34 includes at least a water jacket 52 and winding (not shown in the drawings), a stator 54A thermal conductor 55, and a motor housing 56. A stator 54 having an annular shape is provided on the inner circumference of the water jacket 52. The stator 54 has a plurality of teeth 54B. The winding is wound around each of the teeth 54B. The thermal conductor 55 is provided along the inner peripheral surface 52B of the water jacket 52 and covers the winding and the stator 54. The water jacket 52 is mounted inside the motor housing 56. The rotating shaft 36 is disposed inside the stator 54A and a cylindrical rotor (not shown in the drawings) having a permanent magnet embedded therein is disposed inside the stator 54.

In the stator 54, the plurality of teeth 54B are arranged in the circumferential direction, the teeth 54B protruding toward the inner circumference side of the yoke 54A having an annular shape. Each of the teeth 54B has a spreading shape, and the winding is wound around the body portion thereof with an insulating member interposed therebetween. The thermal conductor 55 is molded with a resin having a high thermal conductivity on the whole of the stator 54, leaving the teeth 54B and the radially-inner end of the winding.

The motor housing 56 is formed of an iron-based casting such as the FC (referred to as a gray cast iron (also referred to as a regular cast iron)), the FCD (referred to as a ductile cast iron) or the like. The motor housing 56 is fitted and mounted on the outer circumference of the water jacket 52 separately formed.

The water jacket 52 is formed of an aluminum alloy having a high thermal conductivity and formed to have an annular shape. A jacket passage 52A is formed inside the water jacket 52 in the circumferential direction, the jacket passage 52A having a zigzag shape. The jacket passage 52A includes a straight hole A1, a communication groove A2, and a communication groove A3. The communication groove A2 and the communication groove A3 are respectively provided on both end faces of the water jacket 52 in the axial direction of the rotating shaft 36, and connect the adjacent straight holes A1 each other at both end faces. The straight holes A1 are provided inside the water jacket 52, and are formed by perforating a plurality of holes (a plurality of holes passages) in the circumferential direction of the water jacket 52 and in parallel with the axial direction of the rotating shaft 36.

The communication groove A2 is communicated with the adjacent straight holes A1 at one end surface of the water jacket 52 (at a front surface side of the sheet of FIG. 2), and the communication groove A3 is communicated with the adjacent linear holes A1 at the other end surface of the water jacket 52 (at a back surface side of the sheet of FIG. 2). The communication groove A2 and the communication groove A3 are closed by sealing members 62 each having an annular shape, the sealing members 62 being arranged on both of the end faces of the water jacket 52 in the axial direction of the rotating shaft 36. In this manner, the jacket passage 52A is formed in a width extending over both of the end surfaces of the water jacket 52 in the axial direction of the rotating shaft 36.

In order to circulate the cooling liquid in the jacket passage 52A configured as described above, at least one cooling liquid supplying port A4 and at least one cooling liquid outputting port A5 are provided in the jacket passage 52A. Here, one communication groove A2 (on the right side in FIG. 2) constituting the jacket passage 52A serves as a cooling liquid supplying port A4, and another communication groove A2 (on the left side in FIG. 2) serves as a cooling liquid outputting port A5. Here, in the sealing member 62 having an annular shape, a hole 62A is provided at a position corresponding to the cooling liquid supplying port A4 and the cooling liquid outputting port A5, the hole 62A being used for forming the cooling liquid passage. Meanwhile, the cooling liquid supplying port A4 and the cooling liquid outputting port A5 may be reversely provided or may be another communicating groove A2 or another communicating groove A3.

The cooling liquid supplying port A4 and the cooling liquid outputting port A5 are connected to a circulation device (a cooling liquid pump) by the piping connection portion 40, the circulation device being provided outside the motor generator 34. With the circulation device, a liquid coolant such as water or fluid circulates through the jacket passage 52A.

The cooling liquid supplying port A4 is connected to the internal tube 41P. The internal tube 41P is connected to the external tube 42P by the piping connecting portion 40. The cooling liquid outputting port A5 is connected to the internal tube 41P. The internal tube 41P is connected to the external tube 42P by the piping connecting portion 40. The motor generator 34 according to the present embodiment is characterized in including the piping connecting portion 40. Prior to the explanation of the piping connecting portion 40, the circulation of the cooling liquid in the cooling structure of the motor generator 34 will be described with reference to FIG. 2.

As shown by a black arrowed line in FIG. 2, the cooling liquid outputted from the cooling liquid pump passes through the external tube 42P provided on the side of the cooling liquid supplying port A4, the piping connecting portion 40, and the internal tube 41P and then reaches the cooling liquid supplying port A4. The cooling liquid reaches the communication groove A3 from the cooling liquid supplying port A4 through the straight hole A1, further reaches the communication groove A2 through another straight hole A1, and then finally reaches the cooling liquid outputting port A5 through further another straight hole A1. The cooling liquid that has reached the cooling liquid outputting port A5 reaches the cooling liquid pump through the internal tube 41P provided on the side of the cooling liquid outputting port A5, the piping connecting portion 40, and the external tube 42P.

In that case, the cooling liquid flows from the cooling liquid supplying port A4 separately into the straight hole A1 arranged on the upper side in FIG. 2 and into the straight hole A1 arranged on the lower side in FIG. 2; however, the embodiment is not limited to that. The cooling liquid flowing from the cooling liquid supplying port A4 to the straight hole A1 on the upper side flows through the straight holes A1 arranged in the upper half of the water jacket 52, the communication groove A2, and the communication groove A3, and thus cools the upper half of the water jacket 52, and the cooling liquid flowing from the cooling liquid supplying port A4 to the straight hole A1 flows through the straight holes A1 arranged in the lower half of the water jacket 52, the communication groove A2, and the communication groove A3, and thus cools the lower half of the water jacket 52. The cooling liquids flowing separately in the vertical direction and cooling the water jacket 52 are mixed each other at the cooling liquid outputting port A5.

The piping connecting portion 40 that the motor generator 34 having the above-mentioned cooling structure includes to connect the external tube 42P and the internal tube 41P each other will be described in detail more.

[Detailed Configuration of Piping Connecting Portion]

FIG. 3(A) and FIG. 3(B) illustrate external views of the piping connecting portion 40. FIG. 4 is a cross sectional view taken along the line A-A of FIG. 3. As shown in FIG. 3 and FIG. 4, the piping connecting portion 40 is fixed, by a bolt B, to an end surface portion C2 of the motor case C at the flange portion F. The piping connecting portion 40 includes a supporting member 50, the supporting member 50 supports the internal tube 41P and the external tube 42P on the same axis so as to allow the internal tube 41P and the external tube 42P to be communicated with each other. Further, the supporting member 50 includes a first supporting portion 41 and a second supporting portion 42. The first supporting portion 41 is provided on a side of the motor case C and supports the internal tube 41P. The second supporting portion 42 is provided on the other side opposite to the motor case C and supports the external tube 42P. The first supporting portion 41 includes a plurality of sealing members, an air chamber 46, and a water draining portion 47. The plurality of sealing members are provided annularly along the outer circumference surface of the internal tube 41P at intervals in the axial direction of the internal tube 41P.

In the present embodiment, the plurality of sealing members include two sealing members, the first sealing member 43 provided on a side of the external tube 42P, the second sealing member 44 provided on a side of the internal tube 41P. Meanwhile, the side of the external tube 42P corresponds to the left side in FIG. 4, and the side of the internal tube 41P corresponds to the right side in FIG. 4. The first sealing member 43 is provided between the air chamber 46 and the external tube 42P. The second sealing member 44 is provided between the air chamber 46 and the motor generator 34. Each of the first sealing member 43 and the second sealing member 44 is constituted of an O-ring. Preferably, a wire diameter (a thickness) of the second sealing member 44 is larger than a wire diameter (a thickness) of the first sealing member 43 provided on the side of the external tube 42P.

The first supporting portion 41 includes an inner portion 41a and an outer portion 41b, the inner portion 41a being provided on a side closer to the internal tube 41P side than to the flange F, the outer portion 41b being provided on a side closer to the external tube 42P than to the flange F. The inner portion 41a is fitted into an opening portion C3 that is provided in the end face portion C2 of the motor case C. The outer portion 41b protrudes from the opening portion C3 toward a side of the external tube 42P. The first supporting portion 41 includes a first concave groove 41A and a second concave groove 41B, the first concave groove 41A being provided in the outer portion 41b, the second concave groove 41B being provided in the inner portion 41a. The first concave groove 41A and the second concave groove 41B are provided annularly along the outer circumference surface of the internal tube 41P. Specifically, the first concave groove 41A is formed between a first protrusion 411 and a second protrusion 412, the first protrusion 411 protruding in the inner diameter direction (the direction toward the center of the internal tube 41P) on the side of the external tube 42P, the second protrusion 412 protruding in the inner diameter direction on the side of the internal tube 41P. The second concave groove 41B is formed between a third protrusion 413 and a fourth protrusion 414, the third protrusion 413 protruding in the inner diameter direction on the side of the external tube 42P, the fourth protrusion 414 protruding in the inner diameter direction on the side of the internal tube 41P. The first protrusion 411, the second protrusion 412, the third protrusion 413, and the fourth protrusion 414 are in contact with the outer circumference surface of the internal tube 41P.

The first sealing member 43 is arranged in the first groove 41A, and is tightly contacted to the outer circumference surface of the internal tube 41P. The second sealing member 44 is arranged in the second concave groove 41B, and is tightly contacted to the outer circumferential surface of the internal tube 41P. In the embodiment, a distance between the first sealing member 43 and the second sealing member 44 (a distance in the axial direction of the internal tube 41P) is configured to be longer than a length of the second supporting portion 42 (a length in the axial direction of the external tube 42).

Meanwhile, in order to realize the waterproofing performance in fixing the supporting member 50 to the motor case C with the bolt B, a third sealing member 45 (an O-ring) is provided on a contacting surface between the supporting member 50 and the motor case C. In addition, the external tube 42P is fitted to the first supporting portion 41 by a commonly-known method, and is supported by the first supporting portion 41 with the waterproofing performance.

Meanwhile, the first sealing member 43 on the side of the external tube 42P sufficiently provides the waterproofing performance with the internal tube 41P, and the leakage from the internal tube 41P can be prevented. And, the second sealing member 44 on the side of the internal tube 41P is capable of preventing the leakage inside the motor generator 34 even when the first sealing member 43 on the side of the external tube 42P wears and leaks the liquid from the internal tube 41P, for example. Furthermore, in addition to realizing the waterproofing performance, both of the first sealing member 43 on the side of the external tube 42P and the second sealing member 44 on the side of the internal tube 41P support the internal tube 41P with these two sealing members, and thereby the internal tube 41P is supported freely in the radial direction and in the thrust direction. In this manner, it is possible to absorb vibrations that are generated between the cooling liquid pipe (the internal tube 41P) and the motor case C because of the rotations of the motor generator 34. In particular, the wire diameters of the two sealing members are varied, the second sealing member 44 provides a buffer function (a vibration absorbing function) with use of the second sealing member 44 provided on the side of the internal tube 41P that has a larger one of the wire diameters, and the waterproofing function is realized by the first sealing member 43 provided on the side of the external tube 42P that has a smaller one of the wire diameters.

The air chamber 46 is provided annularly along the outer circumference surface of the internal tube 41P. The air chamber 46 is provided between the first sealing member 43 and the second sealing member 44. Specifically, the air chamber 46 is separated from the first concave groove 41A by the second protrusion 412, and is separated from the second concave groove 41B by the third protrusion 413. In the embodiment, an inner diameter of the air chamber 46 is formed to be larger than an inner diameter of the first concave groove 41A and the inner diameter of the second concave groove 41B. In addition, a width of the air chamber 46 (the length of the internal tube 41P in the axial direction) is formed to be larger than a width of the first concave groove 41A and a width of the second concave groove 41B. The inner wall of the air chamber 46 on the side of the external tube 42P is positioned closer to the external tube 42P side than to the flange F. The inner wall of the air chamber 46 on the side of the internal tube 41P is positioned closer to the internal tube 41P side than to the flange F.

The water draining portion 47 communicates the air chamber 46 with the outside of the motor case C. Specifically, the water draining portion 47 includes a hole provided in the first supporting portion 41 so as to connect the air chamber 46 and the outside of the motor generator 34 to each other. The water draining portion 47 is provided vertically below or substantially vertically below the air chamber 46 having an annular shape. In the embodiment, the hole of the water draining portion 47 is inclined downwardly from the internal tube 41P side toward the external tube 42P side, and opens approaching the external tube 42P side from the flange F. The air chamber 46 serves as a buffer space for the cooling liquid that has leaked from the internal tube 41P even when the leakage occurs due to the abrasion of the first sealing member 43 on the side of the external tube 42P. In this manner, it is possible to prevent the cooling liquid from directly leaking into the motor case C. In addition, the position of the water draining portion 47 is provided on the vertically lower side of the air chamber 46 annularly formed such that the cooling liquid leaked from the internal tube 41P and accumulated in the air chamber 46 is drained. In this manner, the cooling liquid accumulated in the air chamber 46 can be drained to the outside of the motor case C (the outside of the motor generator 34) by the gravity.

As described above, according to the liquid-cooled motor according to the present embodiment, since the liquid-cooled motor includes the piping connection portion having the plurality of sealing members (the O-rings), the vibrations generated in the cooling liquid pipe by the rotation can be well absorbed, and additionally it is possible to provide a liquid-cooled motor with the good waterproofing performance.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

For example, the plurality of first sealing members 43 may be provided on a side closer to the external tube 42P than to the air chamber 46, and the plurality of second sealing members 44 may be provided on a side closer to the internal tube 41P than to the air chamber 46.

What is claimed is:

1. A liquid-cooled motor comprising:
a motor case;
a motor arranged inside the motor case;
an internal tube in which cooling liquid flows, the internal tube being arranged inside the motor case;
an external tube in which the cooling liquid flows, the external tube being arranged outside the motor case; and
a supporting member fixed to the motor case, the supporting member supporting the internal tube and the external tube and allowing the internal tube and the external tube to be communicated with each other,
wherein the supporting member includes:
a first supporting portion arranged to a side of the motor case, the first supporting portion supporting the internal tube; and
a second supporting portion arranged to another side opposite to the side of the motor case, the second supporting portion supporting the external tube,
and wherein the first supporting portion includes:
a plurality of sealing members respectively arranged in a plurality of concave grooves that are circularly arranged along an outer circumference surface of the internal tube at intervals in a direction of an axial of the internal tube;
an air chamber formed of walls forming the concave grooves and arranged between the plurality of the sealing members; and
a water draining portion inclining downwardly from the internal tube side toward the external tube side and allowing the air chamber and an outside portion of the motor case to be in communication with each other.

2. The liquid-cooled motor according to claim 1,
wherein the air chamber is circularly arranged along the outer circumference surface of the internal tube,
wherein the plurality of sealing members include:
a first sealing member arranged between the air chamber and the external tube; and
a second sealing member arranged between the air chamber and the motor,
and wherein the second sealing member has a wire diameter larger than another wire diameter of the first sealing member.

3. The liquid-cooled motor according to claim 1,
wherein the plurality of concave grooves include:
a first concave groove formed between a first protrusion and a second protrusion that are arranged separately from each other in an axial direction of the internal tube and protrude toward the internal tube; and a second concave groove formed between a third protrusion and a fourth protrusion that are arranged separately from each other in the axial direction of the internal tube and protrude toward the internal tube, and wherein the air chamber is formed of the second protrusion and the third protrusion that are separately arranged adjacent to each other in the axial direction of the internal tube.

4. The liquid-cooled motor according to claim 3, wherein the supporting member includes
- a flange attached to an end surface portion of the motor case, wherein the first supporting portion includes:
- an inner portion arranged closer to the motor than the flange and fitted into an opening portion that is provided in the end surface portion; and
- an outer portion arranged closer to the external tube than the flange, wherein the first concave groove is provided in the outer portion, and wherein the second concave groove is provided in the inner portion.

\* \* \* \* \*